March 31, 1925. 1,531,712
J. L. MEADE
MANUFACTURE OF HOLLOW RUBBER ARTICLES
Filed April 16, 1923
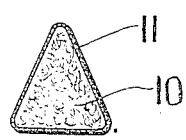
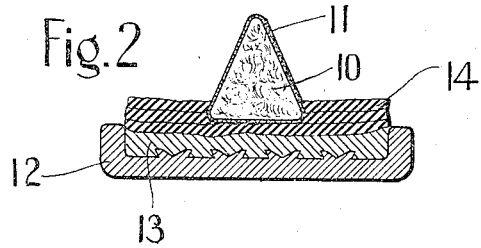
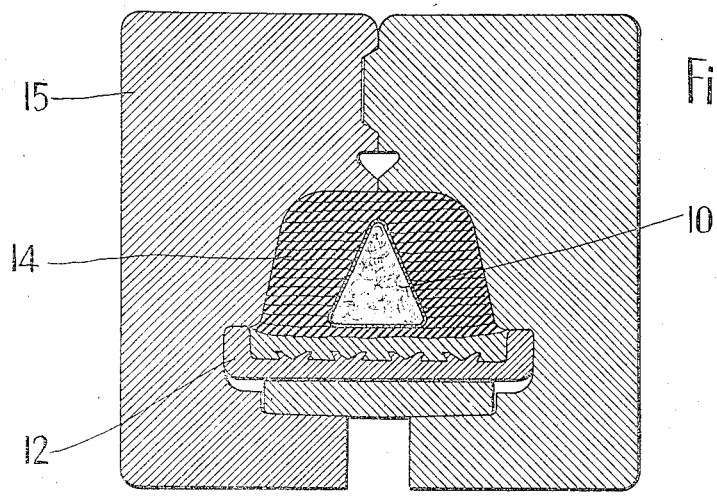
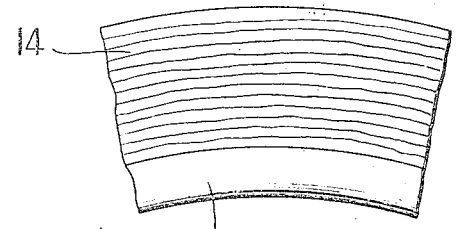
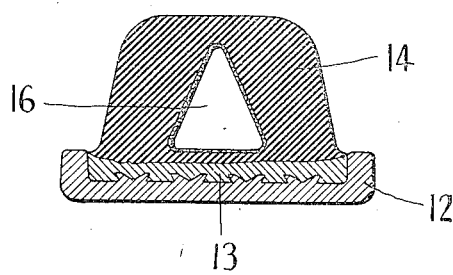
INVENTOR.
John L. Meade
BY
Edward V. Taylor
ATTORNEY.

Patented Mar. 31, 1925.

1,531,712

UNITED STATES PATENT OFFICE.

JOHN L. MEADE, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

MANUFACTURE OF HOLLOW RUBBER ARTICLES.

Application filed April 16, 1923. Serial No. 632,244.

*To all whom it may concern:*

Be it known that I, JOHN L. MEADE, a citizen of the United States of America, residing at Springfield, in the county of Hampden and State of Massachusetts, have invented certain new and useful Improvements in the Manufacture of Hollow Rubber Articles, of which the following is a specification.

This invention relates to the manufacture of hollow rubber articles, and finds particular utility in the making of cushion solid tires.

It has for its object the formation of an enclosed space in the body of the article, without leaving any core in place after the article is finished and without necessity for providing holes in the article for removal of a core. It has for a further object the provision of a core around which the article may be formed, and which decomposes or otherwise reduces in bulk during the vulcanization of the article so that its removal is unnecessary or very easy. It has for a further object the provision of a core of this character which will furnish internal pressure on the article during vulcanization. It has other and further objects which will appear from the specification and claims.

For convenience the invention will be described as applied to the building of cushion solid tires. In articles of this class proposals have been made to secure resiliency by forming an annular recess within the body of the tire. Prior methods of forming such tires have required either that the tire rim be made in two pieces so as to permit the recess-forming core to be removed, that a sectional core be used which is removed through one or more apertures in the rim, or that an annular sand or water bag be used. According to my invention the core is made of material adapted to decompose at the vulcanizing temperature. Preferably also this core is made of material which will volatilize or gasify at vulcanization conditions so as to exert internal fluid pressure on the tire.

As a suitable material for forming the core I prefer to use wool, in the form of rags or waste, or hair felt, moistened with caustic potash in preferably 10 per cent aqueous solution. The caustic will destroy the fiber, first turning it into a mass similar to jelly, and finally, after vulcanization, to a small quantity of syrup-like liquid. During vulcanization the liquid vaporizes, and the pressure of this vapor, together with that of any gas which may be formed by the reaction, will press the article outwardly into the mold.

Instead of wool I may use other materials such as cotton, linen, hemp, ramie, etc., and instead of caustic I may use other chemicals which have the property of destroying the core, such as sulfuric acid. I prefer, however, to use the combination of wool and caustic mentioned.

I will now proceed to describe the invention in specific adaption to the making of cushion solid tires, such as are used on motor trucks, and will refer to the accompanying drawings, in which—

Fig. 1 is a transverse section through a core constructed according to my invention;

Fig. 2 is a section showing the start of the operation of building a tire around the core.

Fig. 3 is a similar section showing the tire built up and located in a mold ready for vulcanization;

Fig. 4 is a fragmentary side elevation of the tire before being placed in the mold; and Fig. 5 is a section of the tire after vulcanization.

The core 10 shown in Fig. 1 is formed of wool or other suitable material soaked in a solution of caustic potash in water, conveniently of a 10 per cent strength, (although changes in the strength or substitutions of materials may be made if desired). In the drawings this core has been shown as covered with a fabric sheath 11.

This sheath serves to retain the core in shape and to make it somewhat easier to handle. It may be dispensed with, however, or a sheath of rubber substituted. The core is made as an annulus of the diameter and cross-sectional shape desired in the cushion hole in the finished tire.

The tire itself is formed on a metal rim 12 (Fig. 2) as is customary, a layer of hard rubber 13 being first placed upon it. The body of the tire in the embodiment shown is built up of laminations of rubber 14, although other methods of formation such as are known in the art can be used if desired. Upon the hard rubber 13 or upon a bed of the rubber 14 the annular core 10 is laid.

The rest of the laminations 14 are now applied and the tire shaped to approximately its proper form. It is then confined in a mold 15 and subjected to heat and pressure in the usual way. After vulcanization it will be found that the body of the core will have disappeared, and its place taken by a small quantity of a liquid. If desired this liquid can be removed by tapping through the rim into the cavity 16, but its presence in the tire will not be ordinarily objectionable.

Having thus described my invention, I claim:

1. In the making of hollow rubber articles, building the article around a core of material evanescing at the vulcanizing temperature, and vulcanizing the article to cure the rubber and destroy the core.

2. In the making of hollow rubber articles, building the article around a core of fibrous material mixed with a destroying agent, and vulcanizing the article to cure the rubber and destroy the core.

3. In the making of hollow rubber articles, building the article around a core of wool moistened with a solution of caustic potash, and vulcanizing the article.

4. In the making of hollow rubber articles, building the article around a core of wool moistened with a ten percent aqueous solution of caustic potash, and vulcanizing the article.

5. In the making of cushion solid tires, incorporating in the tire as built up a core of material evanescing at the vulcanizing temperature, and vulcanizing the tire to cure the rubber and destroy the core, whereby a hollow space is produced in the tire without removal of the core.

6. In the making of cushion solid tires, incorporating in the tire as built up a core of fibrous material mixed with a destroying agent, and vulcanizing the tire to cure the rubber and destroy the core, whereby a hollow space is left in the tire.

7. In the making of cushion solid tires, incorporating in the tire as built up a core of wool moistened with a solution of caustic potash, and vulcanizing the tire.

8. In the making of cushion solid tires, incorporating in the tire as built up a core of wool moistened with a ten percent aqueous solution of caustic potash, and vulcanizing the tire.

JOHN L. MEADE.